(12) United States Patent
Arndt et al.

(10) Patent No.: US 6,501,414 B2
(45) Date of Patent: Dec. 31, 2002

(54) METHOD FOR LOCATING A CONCEALED OBJECT

(75) Inventors: G. Dickey Arndt, Friendswood, TX (US); James R. Carl, Houston, TX (US); Kent A. Byerly, Seabrook, TX (US); Phong H. Ngo, Friendswood, TX (US); Larry G. Stolarczyk, Raton, NM (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/826,402

(22) Filed: Apr. 2, 2001

(65) Prior Publication Data

US 2002/0175849 A1 Nov. 28, 2002

(51) Int. Cl.$^7$ .............................................. G01S 13/00
(52) U.S. Cl. ............................ 342/22; 342/194; 342/27
(58) Field of Search ........................ 342/22, 27, 194, 342/191, 196

(56) References Cited

U.S. PATENT DOCUMENTS

| | | | |
|---|---|---|---|
| 3,713,156 A | 1/1973 | Pothier | 343/17 |
| 3,775,765 A | 11/1973 | Di Plazza et al. | 343/5 R |
| 4,062,010 A | 12/1977 | Young et al. | 343/5 NA |
| 4,072,942 A | 2/1978 | Alongi | 343/5 NA |
| 4,218,678 A * | 8/1980 | Fowler et al. | 343/5 |
| 4,240,027 A | 12/1980 | Larsen et al. | 324/57 |
| 4,271,389 A | 6/1981 | Jacobi et al. | 324/58.5 |
| 4,746,867 A | 5/1988 | Gunton | 324/329 |
| 4,937,580 A | 6/1990 | Wills | 342/22 |
| 5,051,748 A | 9/1991 | Pichot et al. | 343/22 |
| 5,325,095 A * | 6/1994 | Vadnais et al. | 342/22 |
| 5,327,139 A * | 7/1994 | Johnson | 342/22 |
| 5,339,080 A * | 8/1994 | Steinway et al. | 342/22 |
| 5,357,253 A * | 10/1994 | Van Etten et al. | 342/22 |
| 5,363,050 A | 11/1994 | Guo et al. | 324/638 |
| 5,420,589 A | 5/1995 | Wells et al. | 342/22 |
| 5,499,029 A * | 3/1996 | Bashforth et al. | 342/22 |
| 5,557,277 A | 9/1996 | Tricoles et al. | 342/22 |
| 5,592,170 A | 1/1997 | Price et al. | 342/22 |
| 5,673,050 A | 9/1997 | Moussallu et al. | 342/22 |
| 5,680,048 A | 10/1997 | Wolllny | 324/329 |
| 5,819,859 A | 10/1998 | Stump et al. | 175/26 |
| 5,837,926 A | 11/1998 | Franklin | 102/427 |
| 5,867,117 A | 2/1999 | Gogineni et al. | 342/22 |
| 5,942,899 A | 8/1999 | Shrekenhamer et al. | 234/326 |
| 6,094,157 A * | 7/2000 | Cowdrick | 342/22 |
| 6,323,807 B1 * | 11/2001 | Golding et al. | 342/419 |

* cited by examiner

Primary Examiner—Thomas H. Tarcza
Assistant Examiner—Brian K Andrea
(74) Attorney, Agent, or Firm—Hardie R. Barr; James M. Cate (57) ABSTRACT

Apparatus and methods are disclosed for detecting anomalies in microwave penetrable material that may be used for locating plastic mines or pipes underneath the ground. A transmitter is positioned at a plurality of different positions above the ground. A microwave signal is transmitted that is stepped over a plurality of frequencies. At each position, a plurality of reflections are received corresponding to each of the plurality of frequencies that were transmitted. A complex target vector may be produced at each position that contains complex values corresponding to magnitude, phase, and time delay for each of the plurality of reflections received at that location. A complex reference data vector may be produced, either based on predetermined values or based on data from the received plurality of reflections. A comparison is made between the complex target vector and the complex reference data vector to produce a channel vector. In one embodiment, an operator may be applied to the channel vector such as a complex filter matrix or to add a complex conjugate. A response signal is produced and anomalies are detected by variations in the response signal with respect to the plurality of positions.

52 Claims, 5 Drawing Sheets

METHOD FOR LOCATING A CONCEALED OBJECT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to detecting anomalies in microwave penetrable material and, more particularly, to the use of multiple reflections obtained at each of multiple positions in the microwave penetrable material for determining such anomalies. Anomalies of this type include but are not limited to plastic land mines, underground plastic pipes, liquid/foam interfaces, interfaces between geological materials, voids, and the like, which may be found in microwave penetrable environments that may camouflage such anomalies to a high degree.

2. Description of Prior Art

On average, every twenty minutes someone in the world loses a limb to a landmine. Many landmines are made of plastic.

Ground probing radar (GPR) has been used with some success in detecting underground metallic objects, but systems for detecting plastic or nonferrous objects are unreliable and have very little real world detection success for small objects. The environment of the ground provides an effective mask that makes it difficult to distinguish plastic and nonferrous materials electromagnetically. For instance, false detections caused by rocks, tree roots, air pockets, soil inhomogeneity, and miscellaneous buried objects are often a problem. Another problem is the apparent disappearance of a mine at some frequencies caused by either a permittivity match with the surrounding soil or an unfavorable complex addition of reflected energy at the receiver. Additional problems arise from high moisture content in the soil or a layer of water above the mine or plastic object.

Electromagnetic induction techniques generally work well for metallic objects. However, the amount of metal in plastic mines is often very small (only the fuse element, or none at all). This makes detection of plastic mines difficult or impossible. Plastic or PVC pipe cannot be detected in this way.

Infrared detection is another technique commonly used for mine detection. Because there is generally a difference in the heating/cooling rate of the mine as compared to the soil, at certain times of the day a surface spot above the mine can be detected because of a slight temperature difference. However, this technique fails when the day/night temperature changes are minimal and when the mine is buried more than a few inches deep.

Other techniques such as superconducting magnetic field gradiometers, nuclear magnetic resonance imaging, and thermal neutron activation have been used with some success, but all have been shown to be deficient in one respect or another for detecting small plastic land mines. In addition, the equipment using these techniques is heavy, costly, and not amenable for field use in many environments.

Patents related to this area show many attempts to solve the above problems.

U.S. Pat. No. 5,867,117, issued Feb. 2, 1999, to Gogineni et al., discloses an apparatus and method for detecting an object and determining the range of the object. A transmitter, coupled to an antenna, transmits a frequency-modulated probe signal at each of a number of center frequency intervals or steps. A receiver, coupled to the antenna when operating in a monostatic mode or, alternatively, to a separate antenna when operating in a bistatic mode, receives a return signal from a target object resulting from the probe signal. Magnitude and phase information corresponding to the object are measured and stored in a memory at each of the center frequency steps. The range to the object is determined using the magnitude and phase information stored in the memory. The present invention provides for high-resolution probing and object detection in short-range applications. The present invention has a wide range of applications including high-resolution probing of geophysical surfaces and ground-penetration applications. The invention may also be used to measure the relative permittivity of materials.

U.S. Pat. No. 5,592,170, issued Jan. 7, 1997, to Price et al., discloses a frequency-agile, narrow-instantaneous bandwidth radar system that detects objects, and discriminates between different types of objects, from a safe stand-off distance. Transmit circuitry transmits a train of continuous wave signals in a multitude of stepped operating frequencies that illuminates the target area. Return signals from the target area are received through at least a pair of spaced-apart receive antennas. Signal receive/processing circuitry coupled to the spaced-apart receive antennas selectively combines and processes the return signals to identify variations in the received signals indicative of the presence of a specific type of object. At each of the stepped frequencies, the system noise and the clutter of the signals is reduced by averaging and smoothing the incoming data, and the cross-power spectrum at each frequency is calculated. Using the information of the power spectra of all frequencies, the Mahalanobis distance is defined and the presence and classification of a target is determined. Using the information of the cross-power spectra of all frequencies, the location of the mine is determined by the azimuth angle and echo time.

U.S. Pat. No. 4,240,027, issued Dec. 16, 1980, to Larsen et al., discloses a method for electromagnetic analysis of cellular or cell ghost physiology and pharmacology without disrupting the physical integrity of the cell membrane is described. The method utilizes the technique of multi-frequency automatic network analysis and signal processing to derive complex permittivities from the error corrected complex reflection coefficient of cell containing samples at each measured frequency. Complex permittivity at each frequency is then related to the dispersion in dielectric conductivity (a term which includes ohmic and non-ohmic losses) thereby measuring the ion permeability barrier and transport functions of the cell membrane and ion distribution inside of and outside of the cell membrane. The method measures the complex reflection coefficient of a capacitive termination containing a cellular sample as high frequencies are applied. Meaningful data can be developed in the range of frequencies of from 100 KHz to 100 MHz depending upon the exact nature of the cells and the automatic network analyzer used.

U.S. Pat. No. 5,557,277, issued Sep. 17, 1996, to Tricoles et al., discloses a method for imaging substances leaking from underground structures using continuous-wave signals that includes the steps of translating an antenna array over the ground, transmitting a continuous-wave signal into the ground at an array of points, detecting the amplitude and phase of the reflected signal at each point, transforming the reflectance values into the frequency domain, propagating this reflectance spectrum to a predetermined depth, and transforming the propagated spectrum into an image in the spatial domain at that depth. An image representing the underground structure containing the substance may be overlayed on the calculated image to detect differences that represent leakage. Successive images of the same area may be produced over a period of time and the differences compared to determine the rate of leakage.

U.S. Pat. No. 5,819,859, issued Oct. 13, 1998, to Stump et al., discloses an apparatus and method for locating an underground object or structure by employment of a radar-like probe and detection technique. The underground structure is provided with a device which generates a specific signature signal in response to a probe signal transmitted from above the ground. Cooperative action between the probe signal transmitter at ground level and the signature signal generating device provided on the underground object provides for accurate detection of the subsurface object, despite the presence of a large background noise signal. The depth and, if desired, orientation of the underground object may also be determined using the signature signal generated by the signature signal generating device mounted to the underground object. Orientation information may be may be encoded on the signature signal or transmitted as an information signal separate from the signature signal. The probe signal may be microwave or acoustic. The signature signal produced by the signature signal generating device mounted to the underground object may be generated either passively or actively. Further, the signature signal bay may be produced in a manner which differs from the probe signal in one or more ways, including phase, frequency content, information content, or polarization. Also, the signature signal generating device may produce both location and orientation information, without the need for a separate orientation detecting device. Alternatively, orientation and location information may be produced by independent orientation detection and signature signal generating devices.

U.S. Pat. No. 5,942,899, issued Aug. 24, 1999, to Shrekenhamer et al, discloses a passive mine detection apparatus useful for searching out buried mines, exploits natural soil emissions at microwave frequencies and unique interference-induced spectral reflection signatures from planar surfaces of buried mines interacting with the soil emissions. The apparatus comprises a focused beam antenna, low noise amplifiers for respective polarizations, baseband converter, spectrum analyzer, A to D converter, signature recognition processor, display and/or alarm. Hand-held and vehicle-mounted implementations are disclosed.

U.S. Pat. No. 4,072,942, issued Feb. 7, 1978, to A. V. Alongi, discloses an apparatus for the detection of buried objects comprising a broadband, high resolution short pulse transmitter and a bistatic or monostatic noncontacting antenna for radiating the transmitted signal through the ground for reflection from a buried object, a sampling type receiver which reduces the bandwidth and center frequency of the received signal, and a locking circuit controlled by the first reflection from the ground or soil surface to thereby lock the range sweep to the soil surface and eliminate the effects of antenna height variations.

U.S. Pat. No. 4,937,580, issued Jun. 26, 1990, to R. H. Wills, discloses a ground probing radar for detecting radar reflections from underground objects. The radar is of the pulse compression type. A transmitter generates a biphase digitally modulated carrier signal. The digital modulations comprise successive pairs of complementary codes. Reflections of the transmitted signal from underground objects are demodulated and cross-correlated with the code words to produce a reflectivity sequence signal. The use of complementary codes results in minimal time sidelobes and improved range and resolution.

U.S. Pat. No. 4,062,010, issued Dec. 6, 1977, to Young et al., discloses an apparatus and method wherein an electrical impulse source transmits a radar-type signal through an antenna into the ground and is reflected by a target. The reflected signal or echo is detected by the antenna and an analog-to-digital converter converts it to a digital form which may be readily operated on, stored and recalled. A memory stores the information until recalled for comparison with a subsequent signal to give an indication of the location of metallic and non-metallic buried targets.

U.S. Pat. No. 5,363,050, issued Nov. 8, 1994, to Guo et al., discloses a microwave imaging system wherein a three dimensional profile of the dielectric permittivity of a target is obtained. A transmitter transmits microwaves toward a target, and the target scatters the microwaves. The scattered waves are received by an antenna and are converted into suitable data for application to a digital computer. The computer processes the data using either a scattering matrix algorithm or a Fourier transform algorithm. The computer then generates data representative of a three dimensional profile of dielectric permittivity which can be displayed on a suitable display device such as a CRT.

U.S. Pat. No. 3,775,765, issued Nov. 27, 1973, to Di Piazza et al., discloses a broadband, radar-type system for resolving the sizes and centroid locations of objects buried at a maximum depth in the order of 6 to 10 feet. The system uses a carrier frequency which is high enough so that an instantaneous bandwidth of about 25 percent provides resolution in the order of 1 foot. The system antenna includes impedance matching and focusing means. Polarization diversity of the transmitted beam may be accomplished to distinguish between elongated and generally round objects.

U.S. Pat. No. 4,746,867, issued May 24, 1988, to D. J. Gunton, discloses an antenna assembly for use in locating buried objects wherein particularly long thin objects such as pipes can be located, determining the position, and ascertaining the pipe direction by taking measurements from a single point, without mechanical movement of the antenna, and allowing a better suppression of spurious signals and reduction in false indications; which assembly has a plurality of antenna arms adapted and arranged to transmit and receive radiation into the ground and is characterized in that the arms have, on at least the surface nearest the ground, a cladding of a substantially lossless dielectric material.

U.S. Pat. No. 3,713,156, issued Jan. 23, 1973, to R. G. Pothier, discloses a detector apparatus in which the target area is illuminated by microwave energy in the millimeter range. A microwave lens element focuses the reflected millimeter waves to a focal plane. A microwave to thermal converter is disposed in the focal plane to convert the reflected microwave images to thermal images. A liquid crystal display or an IR area detector, such as a line scan unit is employed to convert the thermal images to a visible display of images in the target area.

U.S. Pat. No. 5,837,926, issued Nov. 17, 1998, to D. E. Franklin, discloses metal structures that are resonant to electromagnetic waves and combined with land mines to make them easier to detect using Ground Penetrating Radar. Knowledge of the resonant characteristics in the metal structures enhances detection and identification.

U.S. Pat. No. 5,680,048, issued Oct. 21, 1997, to W. T. Wollny, discloses a device that detects metallic and non-metallic objects on, flush with, or covered by the ground or other surfaces, or by interfering or obscuring structures or surfaces, using ground penetrating radar, a metal detector and a radiometer. It is specifically designed for detection of non-metallic mines. The coils of the metal detector are mounted in a multi-sensor module with the radar antenna in a co-boresighted and/or co-located arrangement, without degrading the performance of the metal detector or the ground penetrating radar. Preferably, the ground penetrating radar uses a feed and a collimation lens, (such as a Luneberg or Step Dielectric lens), as an antenna to reduce the change in the loss of signal strength due to changes in distance between the surface and the antenna (for short distances). The collimated beam has approximately constant power for distances closer than twice the diameter of the lens. By using the lens with a ground penetrating radar, the antenna can may be held somewhat farther from the ground, as well as eliminating Aclutter@ introduced as the antenna moves closer and farther from the ground. The sensor for the radiometer is co-located in the multi-sensor module. The sensors selected for the multi-sensor module employ different detection phenomena. Therefore, each sensor has its unique source for false alarms. The sensors=independent phenomenologies provide a synergism, which when processed, achieve an increase in probability of detection concurrent with a reduction in the false alarm rate for mines.

U.S. Pat. No. 5,051,748, issued Sep. 24, 1991, to Pichot et al., discloses a transmitting antenna which radiates a micro-wave field through an opening in the form of a rectangular wave-guide applied against the separation surface between a first medium, in which it is located, and a second medium, in which an object is buried. The microwave radiation reflected by the object is collected through the opening of a receiving antenna, also in the form of a rectangular wave-guide, applied against the radiating opening of the transmitting antenna. The collected radiation is measured at a series of points by means of pinpoint antennae located in the collecting opening. Thanks to the antennae arrangement, the collected radiation can be used as such, without having to subtract therefrom the result of a reference measurement. The invention can be used particularly to obtain, non-destructively, images of metal bars buried in reinforced concrete.

U.S. Pat. No. 5,420,589, issued May 30, 1995, to Wells et al., discloses a pulse radar system for determining the subsurface structure of a medium comprising an electronics unit for providing electronic signals and control comprising a utility controller, a sampler controller, and a timing controller such that the timing controller provides a pulsar trigger and the sampler controller provides a sampler trigger; a microwave unit comprising all the microwave components within the system including a pulsar for generating pulses as directed by the timing controller in the electronics unit, a transmitting antenna for receiving the pulses directly from and being in close proximity to the pulsar, a receiving antenna for accepting the pulses emitted from the transmitting antenna, and a receiver in close proximity to and for accepting the pulses from the receiving antenna, and a data unit for receiving signals from the electronics unit and for displaying the data for review and analysis.

U.S. Pat. No. 5,673,050, issued Sep. 30, 1997, to Moussally et al., discloses an ultra-wide band ground penetrating radar (GPR) system providing non-invasive detection and three-dimensional mapping of underground objects and voids. The performance of this radar provides improved underground object detection, location and identification over existing radars through the use of a novel interrupted, frequency modulated, continuous wave (FMCW) signal waveform. A synthetic aperture radar (SAR) technique known as spotlight mode focused (SMF) operation is used to collect data for the underground area of interest, by circumscribing this area with a radar beam provided on an airborne or ground based vehicle. Near-Brewster angle illumination of the ground is used to reduce losses.

U.S. Pat. No. 4,271,389, issued Jun. 2, 1981, to Jocobi et al, discloses that a physiologic facsimile image of a biological target without multipath contamination is obtained by first producing, for each one of a plurality of sample locations which are spaced so as to define a two-dimensional array, a time delay spectrum wherein the frequency of each spectral ordinate represents the instantaneous differential propagation delay between a first microwave signal which has been propagated through the target and a second microwave signal which initially corresponds to the first microwave signal, and which has been propagated through means having a predetermined propagation delay, and measuring the amplitude of the spectral ordinate corresponding to the direct ray path of propagation through the target, so as to obtain a set of data. The set of data is then digitized and converted from time domain to frequency domain. The transformed data is then processed is by sorting the data into column order; magnifying data derived from the sorting step so as to enhance and preserve the resolution of the image; mapping data derived from the magnifying step into further data using a predetermined mapping function so as to enhance the contrast between selected portions of the image; and obtaining a set of control signals which are used to actuate a display device to generate the facsimile image by filtering data derived from the mapping step using a band pass function which rejects spatial frequencies below a predetermined first frequency and/or rejects spatial frequencies above a predetermined second frequency so as to minimize, respectively, the effects of variations in the thickness of the target and/or spurious frequencies resulting from the magnifying step.

It is presently understood by the inventors that real world results for the above discussed prior art involving tests using actual soil and/or varied soil conditions have not produced repeatable and reliable success in locating underground plastic mines or non-metallic underground pipes. Therefore, those skilled in the art have long sought and will appreciate the present invention that addresses these and other problems.

SUMMARY OF THE INVENTION

The present invention provides apparatus and methods for detecting, locating, and identifying concealed objects and to measure small differences in interfaces between liquid/gases and different geological formations. Data responsive to these physical phenomena is acquired using microwave equipment such as a transmitter/receiver and a wide bandwidth antenna. Novel processing techniques provide information about concealed objects that may be disposed in environments, such as soil, that have effectively shielded concealed objects using microwave techniques. One intended use of the invention is to locate and identify land mines, particularly small antipersonnel plastic land mines. Other uses include, but are not limited to, detecting underground plastic pipes, detecting changes in liquid/foam interfaces within storage containers, detecting anomalies in microwave penetrable materials, detecting interfaces between geological materials, e.g., quartz/rocks, phosphates/soil, detecting voids, and the like.

In one embodiment of the invention, a method of detecting anomalies in a microwave penetrable material is provided that comprises steps such as transmitting a microwave signal into the microwave penetrable material that is stepped over a plurality of frequencies at each of a plurality of different positions. A plurality of reflections are received for each of the plurality of frequencies transmitted for each of the plurality of positions. Each of the plurality of reflections have a magnitude and a phase and a time delay that is preferably measured and stored. The magnitude and phase and time delay for each of the plurality of target reflections are utilized to produce a complex target data vector at each of the plurality of positions. For purposes herein, a complex data vector is considered to be a matrix or group of values where one or more values includes complex numbers. The magnitude and phase and time delay for the reference reflections at the one or more of the plurality of positions may be used to produce a complex reference data vector. The complex reference data vectors may compared with respect to the complex target data vector to produce a complex channel vector with respect to the plurality of frequencies for each of the plurality of positions. A complex filter matrix of values corresponding to the plurality of frequencies and the time delays may be determined. The complex filter matrix may be constant for each of the plurality of positions. The complex filter matrix may preferably be a least squares operator useful for predicting reflection amplitude. The complex filter matrix may be multiplied times the complex channel vector and divided by the number of the plurality of frequencies to obtain a response signal with respect to time delay for each of the plurality of positions. The anomalies in the microwave material may then be detected from changes in the response signal with respect for each of the plurality of target points.

Accelerometers may be used to determine the relative location of the plurality of positions in the microwave penetrable material.

In another embodiment, the method comprises utilizing the magnitude and phase and time delay for each of the plurality of reflections to produce a complex target data vector for each of the plurality of positions. The magnitude and phase and time delay for one or more of the plurality of reflections at the one or more of the plurality of positions may be used to produce a complex reference data vector. The complex reference data vector may be compared with respect to the complex target data vector to produce a complex channel vector for each of the plurality of positions. A complex conjugate of the complex channel vector may added to the complex channel vector for each of the plurality of reflections to form a conjugate symmetric complex channel vector. Then an inverse Fourier transform is taken of the conjugate symmetric complex channel vector to thereby produce an impulse function such that impulses are produced located at respective reflection time delays that indicate the anomalies in the microwave material. In a preferred embodiment of this method, the complex reference data is taken on the fly and may be updated so as to remain within about six inches from the transmitter.

In another embodiment, a purely theoretical reference signal may be predetermined for use. The theoretical reference signal is compared to the complex target data vector for each of the plurality of frequencies at each of the plurality of positions to produce an error signal that is used for detecting the anomalies from changes in values of the error signal at each of the plurality of positions. In a preferred embodiment, the theoretical reference signal is determined to be equal to a first quantity of a frequency dependent soil frequency minus an impedance of air divided by a second quantity of the frequency dependent soil frequency plus the impedance of air.

In another embodiment, a complex reference signal is compared with the complex antenna impedance for each of the plurality of reflections at each of the plurality of positions to produce a complex difference signal for each of the plurality of reflections at each of the plurality of positions. The complex difference signal is amplified for each of the plurality of reflections at each of the plurality of positions to produce an amplified complex difference signal. A Fourier transform is taken of the complex difference signal to thereby produce a response signal. In one form of this embodiment, the complex reference signal further comprises determining an average complex antenna impedance for at least two of the plurality of reflections for at least one of the plurality of positions. In another embodiment, a theoretical value for the complex reference signal may be used. Depending on a preferred feature of the embodiment, the complex reference signal may vary over the plurality of positions or remain constant.

An object of the present invention is to detect anomalies such as plastic mines or pipes within a soil environment.

This and other objects, features, and advantages of the present invention will become apparent from the drawings, the descriptions given herein, and the appended claims. It will be understood that any listed objects of the invention are intended only as an aid in understanding aspects of the invention and are not intended to limit the invention in any way.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

The present invention provides apparatus and methods for locating anomalies in microwave penetrable material, e.g., locating plastic mines or plastic (PVC) pipe in soil. Other concealed objects besides plastic mines can be located with the present invention. For example, an object encased in concrete may be detected. Also, the thickness of a concrete floor can be determined and, in some cases, the depth of a plastic pipeline and the diameter of the pipeline can be determined. Also, the fluid in the pipeline can be determined with a certain a priori knowledge. As discussed above, locating anomalies in microwave penetrable material will encompass locating different types of concealed objects or structures.

Figure 1:
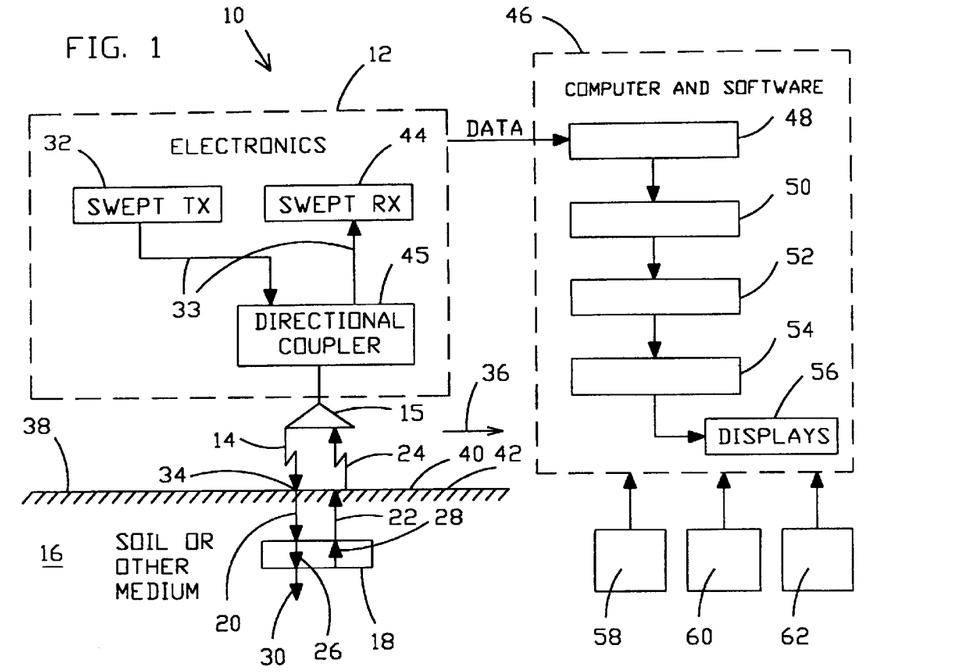
FIG. 1 is a schematic of a block diagram showing an apparatus for transmitting and receiving signals in accord with the present invention.

Referring now to the drawings and, more particularly, to FIG. 1 there is shown a transmitter/processor 10 in accord with the present invention. Electronics section 12 transmits broad band microwave signal 14 from antenna 15 directed into ground or soil 16 where an object, e.g., a plastic mine or plastic pipe, may be present. Soil 16 is a microwave penetrable material. At least a small portion of the electromagnetic wave, as indicated at 20, must penetrate soil 16 that is concealing object 18. Electromagnetic wave 20 impinges upon object 18 and eventually returns to antenna 15 via reflection(s) 22 through soil 16 and continuing as reflection 24 through the air. Antenna 15 may be an RF horn or other antenna suitable for the application. Reflection 24 will have a magnitude, phase, and a time delay. The magnitude and phase of the reflected energy is frequency dependent. In a dielectric object, such as a plastic mine or other object 18, some energy as indicated at 26 will penetrate object 18 and, after one or more internal reflections 28, be directed back toward the antenna. Each of these reflections are also frequency dependent, in magnitude and phase, and become a part of what might be referred to as a signature of object 18 within soil 16. Some energy, as indicated at 30, will be directed further into soil 16. To eliminate frequency variations due to electronics system 12, it is desirable to use phase stable equipment such as phase stable coaxial cable 33.

Swept transmitter 32 steps or sweeps through a plurality of frequencies which may typically include a band of frequencies somewhere in the range from about 1 GHz to about 10 GHz depending on the application, e.g., 2.0 GHz to 3.5 GHz. The number of steps or frequencies transmitted may be selected for a specific purpose, e.g., locating plastic mines buried in soil. A typical number of steps for locating mines may presently be in the range of about fifty frequencies but could be up to several hundred frequencies depending on the time available and the speed of transmitting/processing equipment 10. As a general rule, more frequencies will improve the resolution but will also slow down the processing so that a trade off is necessary. In a presently preferred embodiment, the signal broadcast at each frequency is preferably a continuous signal.

Swept transmitter 32 steps or sweeps through all the frequencies at each of a plurality of positions, such as position 34. Antenna 15 may be physically moved as indicated by arrow 36 above surface 38 of microwave penetrable material or soil 16 and will sweep through each of the plurality of frequencies at each of a plurality of positions such as positions 34, 40, and 42, shown for example only. Positions 34, 40, and 42 are generally laterally positioned with respect to each other and may lay substantially along a linear path of movement of antenna 15 over surface 38. Alternatively, positions 34, 40, and 42 may be positioned within an area such that an x-y coordinate system may be useful in describing their relative position on surface 38. Again, the greater number of positions the better the resolution but this requires more time to process and may require a slower physical movement of antenna 15. Presently, each position is spaced apart by a distance in a range from about one centimeter to about seven centimeters apart. The number of positions will therefore depend on the physical length through which the transmitter is moved. A back and forth substantially linear motion is presently contemplated for detecting mines although the present invention could be adapted to a continuous movement in a particular direction, circular movement, x-y movements, and the like, depending on the desired strategy of covering the area and type of concealed object or target which is being detected. It will be understood that as processing times become faster due to faster hardware, then greater numbers of frequency steps and/or positions may be used. As discussed subsequently, some embodiments for processing may be performed more quickly than others. The antenna movement may be a stepped movement that stops at each position or may be a continuous movement depending on the speed of the equipment and the permitted time. While some movement of antenna 15 may occur during a continuous movement process, the speed of movement is selected such that the entire signal is effectively broadcast at a single position. Means for moving antenna 15 could include manual or automated means. Depending on the terrain of use, automated means may be more accurate and consistent where such use is possible. However, in other locations manual movement of antenna 15 may be desirable.

Swept receiver 44 receives a plurality of reflections due to the plurality of different frequency signals transmitted at each position. Swept receiver receives data from directional coupler 45 and provides this information to computer and software element 46. When received at block 48 and 50, the information including magnitude, phase, and time delay for each reflection may be measured and digitized at 48 and 50, stored for operation at 52, operated on by one of several preferred methods discussed subsequently at 54, and displayed or otherwise used or interpreted at 56 with or without a display. These steps are provided for general description and may be modified as discussed subsequently with respect to presently preferred processing methods.

Other information may preferably also provided to computer and software 46 such as the distance of the transmitter above ground provided at 58. This information may preferably be provided by an acoustic sensor but could also be provided by or checked by other information such as, for instance, the received signal that reflects directly back from the ground. Element 60 provides physical position information so that computer 46 can determine at which physical laterally distributed position above surface 38 of the microwave penetrable material or soil, e.g., 34, 40, or 42, that antenna 15 is located. This preferably includes x-y information as well as straight-line information. In a presently preferred embodiment this may be provided by accelerometers. Elements 58 and 60 provide a three dimensional imaging system to enhance the positional information related to the objects being detected. Elements 58 and 60 therefore provide an imaging system that preferably uses both miniature accelerometers and an acoustic sensor to provide x, y, and z spatial locations. For instance, accelerometers from element 60 may provide x and y position of antenna 15 and an acoustic sensor from element 58 may provide z information for distance above the ground. Additional information from elements 58 and 60 might also include GPS information to determine the particular area being covered. Element 62 may include other types of sensors such as a metal detector to distinguish metal objects although metal objects tend to produce a very strong signal.

Figure 2:
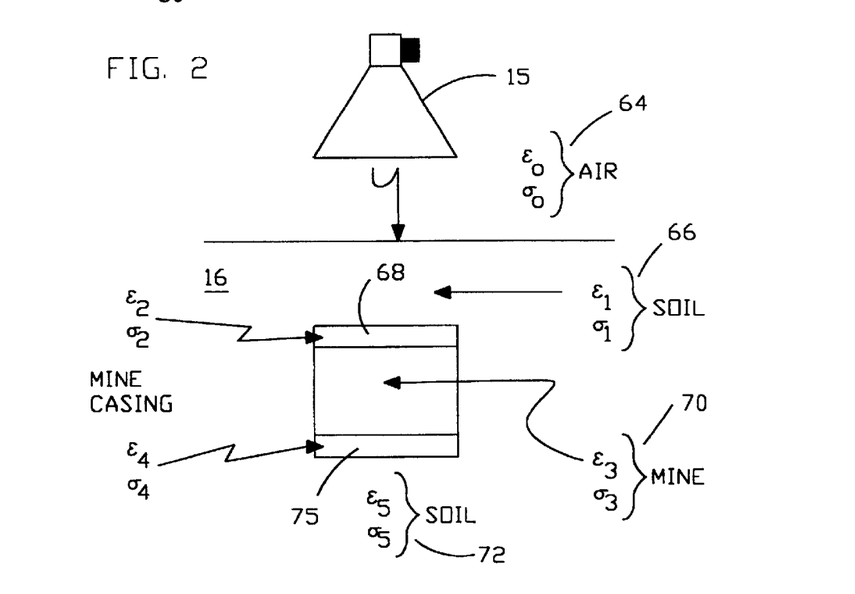
FIG. 2 is a schematic showing an environment of operation for the present invention.

In FIG. 2, the general environment of operation is disclosed along with factors that affect the reflections from the environment. Antenna 15 is sensitive to the environment into which it is radiating. The environment includes air, soil, soil variations, concealed objects, and the like, which may all have different physical properties such as, for instance, permittivity, conductance, speed of propagation of electromagnetic waves, permeability, and the like. These variations are suggested generally in FIG. 2 for air at 64, top soil 66, mine casing top 68, mine 70, lower soil 72, and lower plastic mine casing 75. The antenna sensitivity can be explained in terms of the phase and magnitude of reflected energy that returns to the antenna from multiple objects in the external environment or it can be explained by the impedance of the medium into which it is radiating which is likewise affected by the objects in the environment. In either case, the input impedance of the antenna will be frequency sensitive. In one embodiment of the invention, this variation of input impedance with frequency can be considered to be the signature of the external environment. The larger the bandwidth, the more information is contained in the signature. Consider the environment shown in FIG. 2. Antenna 15 is radiating toward ground 16. The reflected energy from the soil 66, mine casing, and mine 70 are all frequency sensitive and provide a signature in the antenna's input impedance. Generally, it will be desirable to compare a reference signature or signal which might be derived from one or more of group of reflections from a soil/air environment at a plurality of different positions which do not effectively have additional objects such as object 18 therein with respect to the signature or group of reflections that may or may not have objects therein and monitor the difference. In accord with the present invention, a reference signal may be determined theoretically or may be measured as discussed in more detail subsequently. By theoretical, it is generally meant predetermined. The theoretical value could be based on data previously collected and stored or on known values or known average values, e.g., data stored concerning a region where conditions are likely to be similar.

The methods of the present invention provide a means to distinguish objects and often provide more information than other techniques. Better decisions can be made regarding whether or not a concealed object is present and whether the object is the one being looked for or some other, somewhat similar, object. Also, the signature can yield information such as depth, object composition, and object geometry. The success of the methods discussed herein lies in the sophistication of the methods used to enhance the target images in the return signal and to discriminate against other natural objects. The methods of the present invention provide several embodiments for data processing to obtain a usable signature. One of the problems of using microwaves for locating concealed objects has been the difficulty posed by the soil that obscures signals produced by the concealed objects.

More specifically, four embodiments of methods for processing data are discussed herein. These may include Digital Signal Processing (DSP) methods for the detection of plastic land mines and other subterranean objects. In most cases, the methods process a matrix of complex data, which may be referred to as matrix S11, collected by electronics system including a transmitter/receiver that is collected for a plurality of physical .positions. The data is complex in nature and represents the complex impedance seen by a broadband Radio Frequency (RF) transceiver. This complex impedance is assumed to be reflective in nature and is defined for a finite number of frequency points.

In a little more detail, the four methods for detecting concealed objects are referred to subsequently as: (1) Fourier Transform of Amplified Difference Signal, (2) Differential Least Squares (DLS) Matrix (3) Inverse Fourier Transform (IFT) technique, and (4) a Single Reflection Electromagnetic Model (SREM). Each approach has certain qualities and advantages, making the combination of multiple detection processes desirable.

Each method makes significant assumptions regarding the nature of the incoming data. These assumptions are primarily related to the nature of the channel noise and the behavior of RF delays at different frequencies.

Figure 3:
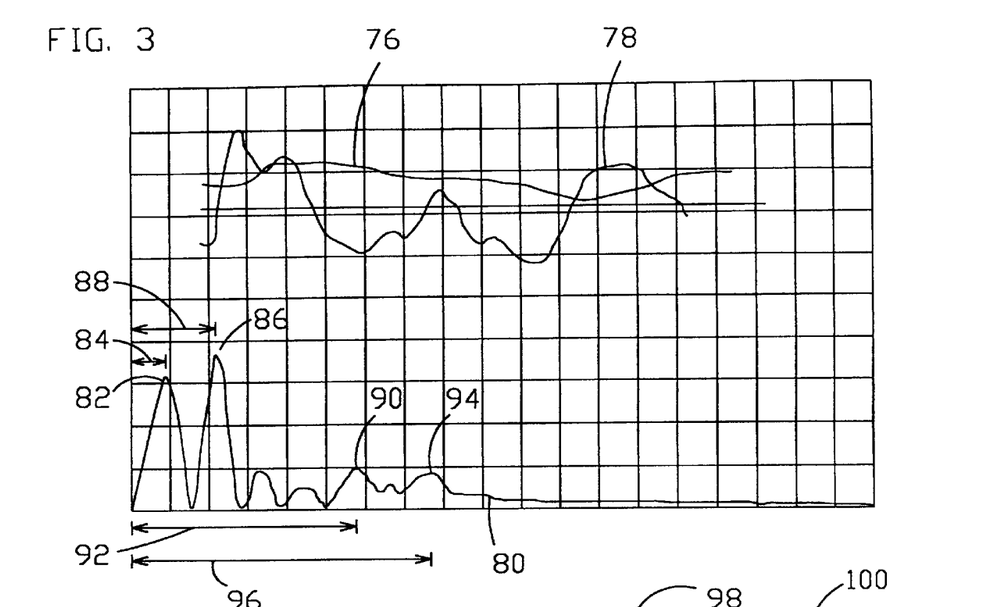
FIG. 3 is a schematic showing a two dimensional single position response with signals used in one embodiment of the invention disclosed herein.

Fourier Transform of Amplified Difference Signal to Determine Concealed Object This embodiment of the invention is discussed with respect to FIG. 3 for which data from only a single physical position is shown. Thus, for FIG. 3 antenna 15 is stationary with respect to the ground. As discussed generally above, a reference signature is produced that is compared to the data signature. The received data processing will typically be the same whether the reference data is measured or theoretical. In one step, a magnitude of the antenna's input impedance for each of a plurality of frequencies across a frequency band is collected as indicated by 76. Curve 76 will therefore be in terms of magnitude versus frequency. For this embodiment as well as other embodiments, the lower frequency, upper frequency, and number of points in the frequency band may be selected dependent on the particular targets to be detected. For sensing a plastic mine 3 inches in diameter and 1½ inches thick, a frequency band of 1 to 10 GHz should typically be the maximum necessary. However, a smaller band may often provide sufficient target information and be more realizable in terms of hardware/software complexity and speed of operation. One method for obtaining a reference'signal is to take a running average of the data of curve 76 across the bandwidth. A running average based on a few data points may provide the best resolution but a larger number of averaged data points reduces the need for amplification and provides a better signal to noise ratio. The running average data set is then systematically subtracted digitally from the original data set, e.g., curve 76, from lower frequency to high frequency across the band or vice versa. The difference data set is generally of small amplitude and is, therefore, preferably uniformly digitally amplified across the band as indicated by curve 78 which is also in terms of magnitude versus frequency. This amplified difference data set contains the desired signature to indicate whether or not an object is present. In the form of amplitude versus frequency, it is difficult to visually interpret the signature. Various processing techniques may be employed to extract the signature in a more usable form. In one embodiment of the present invention, the Fourier transform of the amplified difference data set 78 is taken as indicated by curve 80. Curve 80, unlike curves 76 and 78, is in terms of a magnitude versus transit time. The transit time relates to the difference between transmittal and receiving of each of the plurality of reflections and may typically be in the nanosecond range. While recalling that curve 80 is for a single position only, curve 80 provides a form of the signature that may be interpreted visibly in an intuitive manner or by program control to produce an indication of a located object such as a plastic mine. Looking at the Fourier transform curve 80 in FIG. 3, the first peak 82 is the point of reflection at the antenna input. Time 84 is related to the length of the coaxial cable or waveguide to the antenna.

The second peak 86 is caused by the surface of the ground/air interface. Therefore time 88 may be used, if desired, as a measure or as a check of a measure of the distance from antenna to ground in addition to the previously discussed presently preferred method of using an acoustic sensor. The next larger peak 90 is caused by the top surface of an object such as in this case, a plastic mine. Time 92 is related to the depth of the mine. The following peak 94 is caused by the bottom surface of the mine. Time 96 minus time 92 provides the mine thickness given the speed of the electromagnetic wave in soil. For a metallic mine, peak 94 will not exist. If no mine exists, then neither peak 90 or 94 will exist.

While a running average of actual data was discussed above to provide a reference signature, it is also possible to use a computer code to obtain a predetermined reference signature. The computer code is developed to provide theoretical data for a wide variety of conditions, e.g., wet sand, dry sand, mud, clay, and the like. Other methods to provide a theoretical reference are discussed subsequently. It has been found that using either a data derived or a theoretical reference signature results in a target signature that is recognizable and persistent.

Differential Least Squares (DLS) Matrix

The Differential Least Squares detection method is dependent on two principle assumptions:

1. The distortion mechanisms can be modeled as white Gaussian noise.
2. The reflective time delay is constant over the bandwidth of transmitted RF frequencies.

A minor departure from these assumptions will have little effect on the detection process; however, if these assumptions are completely erroneous under certain operating conditions, the detection performance could suffer significantly. It is assumed that there exist two complex data vectors, $Y_{ref}(\omega)$ and $Y_{tar}(\omega)$, which represent the antenna reference and target signatures, respectively. For purposes herein, a complex data vector is considered to be a matrix or group of values where one or more values includes complex numbers. In other words, the reference is a signature that contains an image of the RF system and the plurality of reflections obtained when no subterranean anomalies are present. The target signature contains everything in the reference signature plus additional subterranean reflections when an object is detected. One assumption made is that the target signature is composed of the reference signature plus a series of P analytical reflections that arise due to the object. This is expressed by the equation:

$$y_{tar}(\omega) = y_{ref}(\omega) + \sum_{i=1}^{P} a_i e^{-j\omega\tau_i}$$

where $\alpha_i$ and $\tau_i$ are the i-th reflections amplitude and time delay, respectively. The so-called channel signature or transfer function is:

$$y_{chan}(\omega) = \sum_{i=1}^{P} a_i e^{-j\omega\tau_i} = y_{tar}(\omega) - y_{ref}(\omega)$$

For sampled data systems, the radial frequency ($\omega$) and the time (t) vectors are quantized. The size of the frequency sample will determine the length of the data vector $Y_{chan}(\omega)$. The size of the time sample will determine the resolution of the time delay detection.

Let $$\omega \to \omega_m : \{\omega_1, \omega_2, \ldots, \omega_M\}$$

and $$t \to t_n : \{t_1, t_2, \ldots, t_N\}$$

be the frequency and time vectors in radians/second and seconds, respectively. Now construct the complex filter matrix that is optimized for least squares:

$$H(e^{j\omega t}) = \begin{pmatrix} e^{j\omega_1 t_1} & e^{j\omega_2 t_1} & \cdots & e^{j\omega_M t_1} \\ e^{j\omega_1 t_2} & e^{j\omega_2 t_2} & \cdots & e^{j\omega_M t_2} \\ \vdots & \vdots & \ddots & \vdots \\ e^{j\omega_1 t_N} & e^{j\omega_2 t_N} & \cdots & e^{j\omega_M t_N} \end{pmatrix} \in C^{(N \times M)}$$

The i-th row of $H(e^{j\omega t})$ represents a discrete complex filter optimized in the least squared sense for detecting reflected power at a time delay $\tau = t_i$ over the sampled RF frequency points.

The detector output for a k-th complex impedance vector, $Y_{chan}(k, \omega)$, may be generated by first windowing, if desired, the impedance vector with the two adjacent vectors $y_{chan}(k-1, \omega)$ and $y_{chan}(k+1, \omega)$, by the weighting function, $$w = \begin{pmatrix} .5 \\ 1 \\ .5 \end{pmatrix},$$

to form a smoothed complex impedance vector $$Y_{chan}(k, \omega) = (Y_{chan}(k-1, \omega) \ Y_{chan}(k+1, \omega))^* w,$$

where the complex impedance vector sampled and position k is the column vector, $$y_{chan}(k, \omega) = \begin{pmatrix} y_{chan}(k, \omega_1) \\ y_{chan}(k, \omega_2) \\ \vdots \\ y_{chan}(k, \omega_M) \end{pmatrix}.$$

The windowed complex impedance vector may, if desired, be normalized to the power of the reference vector. This may done to mitigate the effects of ground to sensor height variations if not suitably corrected by other means such as an acoustic sensor as discussed hereinbefore. If used, the normalized complex impedance vector is $$Y_{norm}(k, \omega) = Y_{chan}(k, \omega) \times \frac{|y_{ref}(\omega)|}{|Y_{chan}(k, \omega)|}.$$

The differential least squares estimate of the reflected power and/or amplitude which may be referred to as an error signal at time delay t, a(t) is then calculated by the equation.

$$\overline{a(t)} = \frac{1}{M} H(e^{j\omega t})(Y_{norm}(k, \omega) - y_{ref}(\omega)).$$

The performance of the DLS detection method has been extensively tested. A variety of RF bandwidths have been evaluated for many different targets in a wide variety of soil and moisture compositions. Although this text is not intended as an exhaustive illustration of the work that has been performed, several plots illustrating the capability of DLS method for a variety of targets and soil conditions are shown. The broadband complex impedance data was collected using a ground penetrating radar system in accord with the system of FIG. 1 and consists of a radio frequency section such as electronics 12. Computer and software section includes a baseband signal processing section such as that of block elements 48 and 50. The baseband signal processing section may preferably transmit the collected data via RF modem to a computer, such as standard IBM lap top computer for real time processing. The remaining DLS implementation processing as discussed above may be effected on a lap top computer, if desired although a dedicated computer may be implemented to improve speed of operation.

Figure 4:
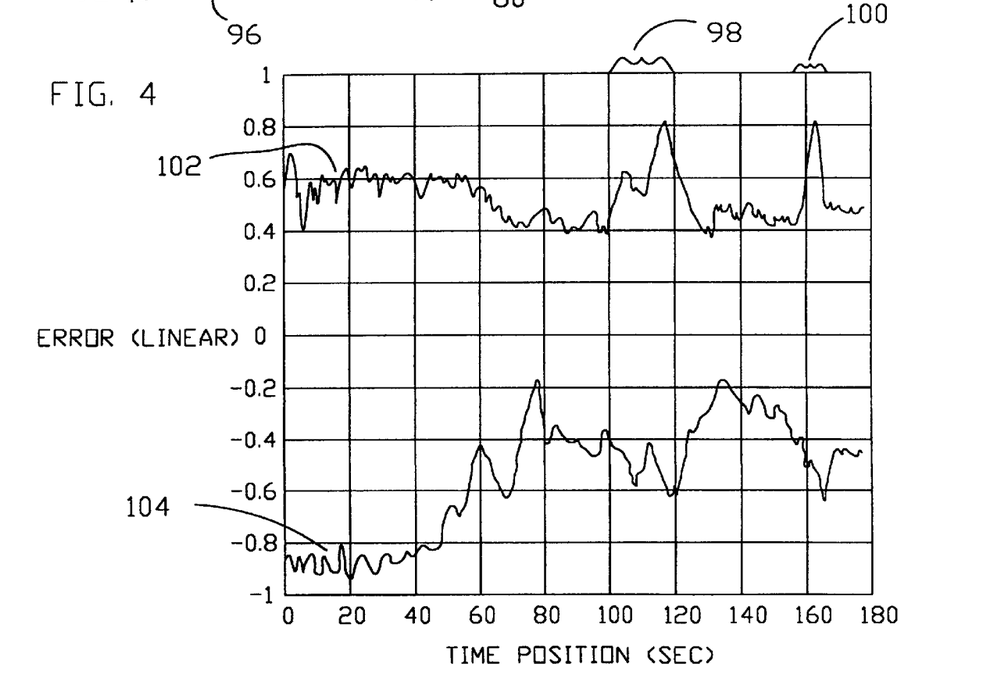
FIG. 4 is a schematic showing a two dimensional integrated response versus time position for a transmitter that transmits into a clay and mud type soil of Houston, Tex. for an embodiment of the invention that includes, among other method steps, determining a differential least squares estimation.

The first plot, FIG. 4, shows the performance of the DLS method in Houston soil, referred to as Houston gumbo that may include clay and damp soil or mud. The data for this plot was collected at an outdoor facility at NASA-JSC. The target is a three-inch, all plastic mine located at 100–120 seconds, as indicated at 98, in the scan time-position. Time is effectively equivalent to distance in this graph (and in several other subsequent graphs) as the transmitter is moved a proportional distance with respect to time. FIG. 4 clearly illustrates the presence of the mine. A second target detected in this run at approximately time index 160 seconds as indicated at 100. After further investigation it was determined that a piece of concrete was located in that position. FIG. 4 is a 2-D plot of the reflection and absorption amplitudes integrated over all reflective time delay values. Curve 102 is the reflection amplitude which is the integrated positive error signals and curve 104 is the absorption amplitude which is the integrated negative error signals. Three-dimensional plots could be used to include transit information that includes both positive and negative error signal data or to show an amplitude plot based on X-Y positioning data. The frequency range used is with respect to FIG. 4 is 2.3 GHz to 3.0 GHz.

Figure 5:
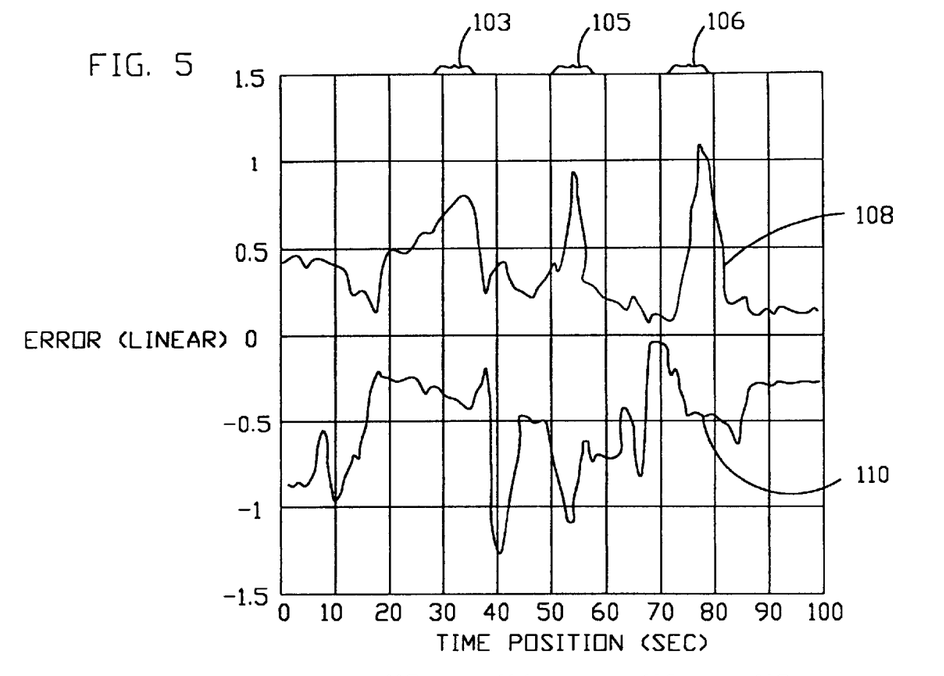
FIG. 5 is a schematic showing a two dimensional integrated response versus time position for a transmitter that transmits into a clay and mud type soil of Houston, Tex. with different targets from that of FIG. 4.

A second data run, FIG. 5, shows the performance of the DLS method in a different target range, also planted in Houston gumbo soil. The data for this plot was also collected at an outdoor facility at NASA-JSC. The targets consist of a piece of 2×2 wood stock located at approximately 30 seconds into the scan time-position as indicated at 103, a 2 inch plastic mine located at 55 seconds into the scan time-position as indicated at 105, and a metal can located at 80 seconds into the scan time-position as indicated at 106. FIG. 5 clearly illustrates the presence of the three targets. In this plot the reflection and absorption amplitudes are integrated over all reflective time delay values. Curve 108 is the integration of all reflective differential power and curve 110 is the integration of all differential absorption. The frequency range used is 2.3 GHz to 3.0 GHz.

Figure 6:
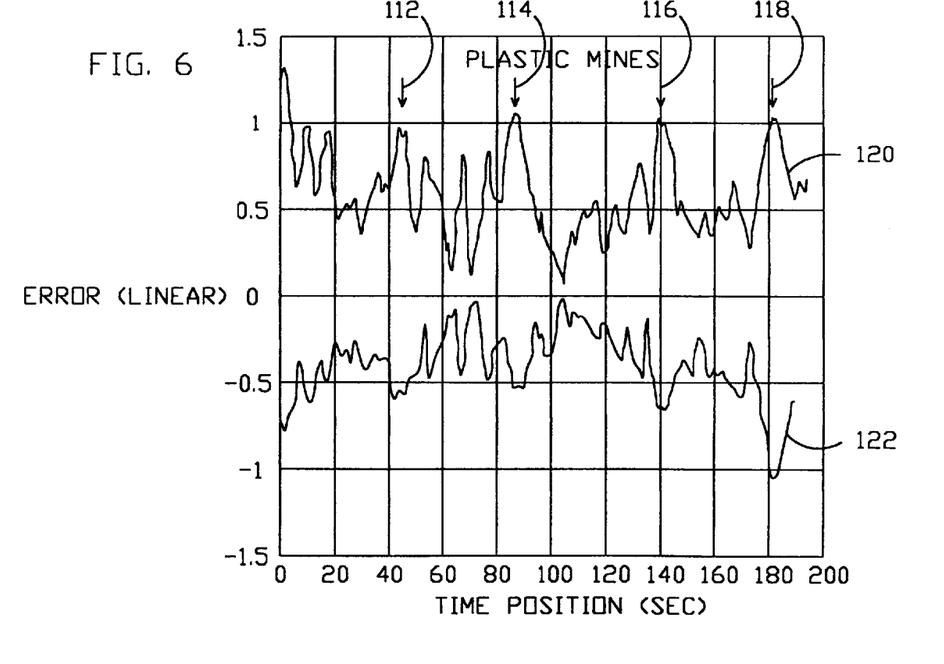
FIG. 6 is a schematic showing a two dimensional integrated response versus time position for a transmitter that transmits into a dry sand soil of Raton, N.Mex. with different targets from that of FIG. 4 or FIG. 5.
Figure 7:
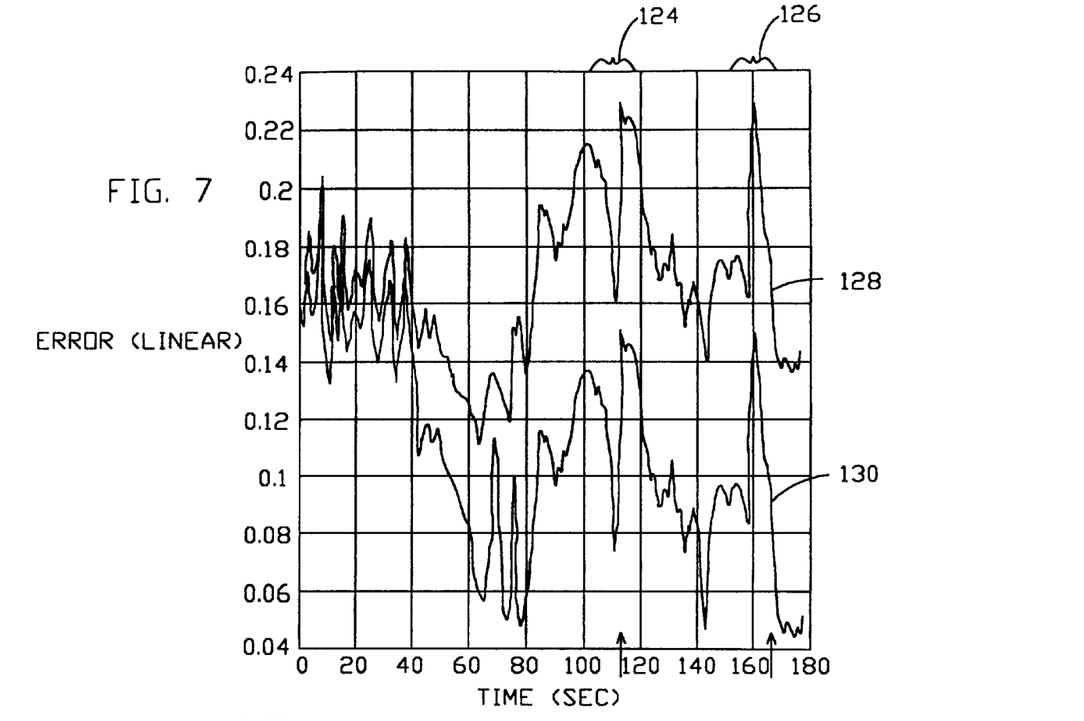
FIG. 7 is a schematic showing an integrated response versus time position of a transmitter that transmits into a clay and mud type soil of Houston, Tex. for an embodiment of the invention that includes, among other method steps, determining a complex spiral deviation.
Figure 8:
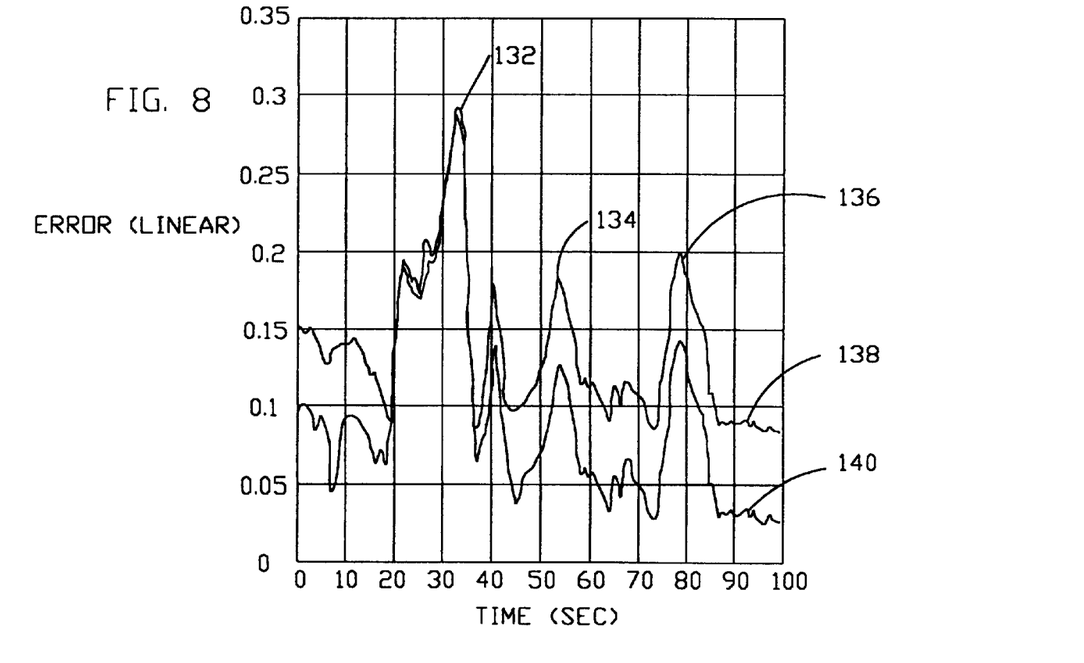
FIG. 8 is a schematic showing an integrated response for the embodiment of the method of FIG. 7 in a clay and mud type soil of Houston, Tex. with different targets from that of FIG. 7.
Figure 9:
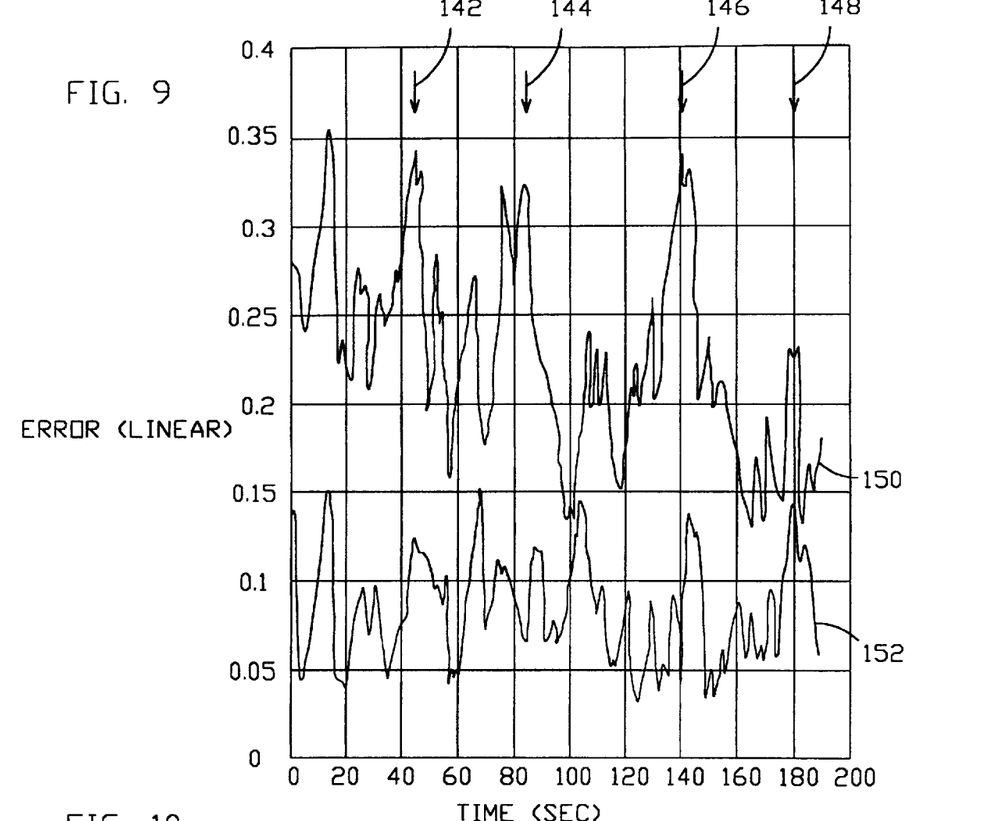
FIG. 9 is a schematic showing an integrated response for the embodiment of the method of FIG. 7 in a dry sandy soil of Raton, N.Mex. with different targets from that of FIG. 7 or FIG. 8.

The third data run, FIG. 6, shows the performance of the DLS method in a New Mexico target range. This soil was drier and sandier than the Houston gumbo. The data from this plot was collected at an outdoor facility at Raton Technology Research. The targets consist of four plastic mines at approximately 45, 85, 140 and 180 seconds into the scan time-position as indicated at 112, 114, 116, and 118, respectively. Each mine was buried at the different depth ranging from 0 inches to 4 inches in depth. The M14 plastic mine of 112 was buried 1½ inches deep at time position 37–53 seconds. The M14 plastic mine of 114 was buried 1 inch deep at time position 81–94 seconds. The EM3 plastic mine of 116 was buried 1½ inches deep at time position 136–153 seconds. The M14 plastic mine of 118 was buried 0 inches deep at time position 178–195 seconds. FIG. 6 clearly illustrates the presence of the four targets. The apparent object at the beginning of the run is assumed to be a rock or other object beneath the surface. In FIG. 6, the reflection and absorption amplitudes are integrated over all reflective time delay values. Curve 120 of FIG. 6 is the integration of all reflective differential power and the curve 122 is the integration of all differential absorption. The frequency range used is 2.3 GHz to 3.0 GHz.

Inverse Fourier Transform Method

The Inverse Fourier Transform (IFT) detection method may be compared most closely to the Differential Least Squares technique discussed above but with notable differences. This method offers less control over the process parameters and does suffer from process distortion mechanisms. On the other hand, the IFT method can take advantage of high-speed DSP methods, such as the Fast Fourier Transform (FFT). Depending on the hardware platform, the IFT method could have certain implementation advantages over the DLS method.

The IFT method is dependent on the same linear reflection and additive noise assumptions that the DLS method was based on:

! the distortion mechanisms can be modeled as white Gaussian noise, and

! the reflective time delay is constant over the bandwidth of transmitted RF frequencies.

As before, it is assumed that there exist two complex data vectors $Y_{ref}(\omega)$ and $y_{tar}(\omega)$, which represent the detectors reference and target signatures, respectively. In practical terms, the reference is a signature that contains an image of the RF system and the surface reflection off the ground. The target signature contains everything in the reference signature plus the subterranean reflections. It will be assumed that the target signature is composed of the reference signature plus a series of P analytic reflections. This is expressed by the equation:

$$y_{tar}(\omega) = y_{ref}(\omega) + \sum_{i=1}^{P} a_i e^{-j\omega \tau_i},$$

where $\alpha_i$ and $\tau_i$ are the i-th reflections amplitude and time delay, respectively. The channel signature or transfer function is $$y_{chan}(\omega) = \sum_{i=1}^{P} a_i e^{-j\omega \tau_i} = y_{tar}(\omega) - y_{ref}(\omega).$$

If the transfer function could be inverted, the result would be the impulse response of the channel signature. For a purely reflective channel, the impulse response would have a distinct peak for each reflection located at that reflections time delay. The amplitude of these impulse response peaks would be an estimate of the reflection power, just as in the DLS case.

For the impulse response function to be real, the frequency domain data must be conjugate symmetric about the origin. Consider the frequency domain vector constructed from the channel signature, $Y_{chan}(\omega)$:

$$Y_{chan}(\omega) = [y_{chan}^*(-\omega), y_{chan}(\omega)].$$

where $>^* =$ is the complex conjugate designation. For ideal conditions, the inverse Fourier transform of $Y_{chan}(\omega)$ will by definition be the impulse response function of the reflective channel.

$$\begin{aligned}
h_{chan}(t) &= \frac{1}{2\pi} \int_{-\infty}^{\infty} Y_{chan}(\omega) e^{j\omega t} d\omega \\
&= \frac{1}{2\pi} \int_{-\infty}^{\infty} \left( \sum_{i=1}^{P} a_i e^{-j\omega \tau_i} \right) e^{j\omega t} d\omega \\
&= \frac{1}{2\pi} \sum_{i=1}^{P} a_i \int_{-\infty}^{\infty} e^{j\omega(t-\tau_i)} d\omega \\
&= \sum_{i=1}^{P} a_i \delta(t - \tau_i)
\end{aligned}$$

where $\delta(t)$ is by definition an impulse function position at $t=0$.

There are several practical issues that arise at this point, which relate to the frequency domain sampling of $Y_{chan}(\omega)$. Since $Y_{chan}(\omega)$ is only defined at discrete values of $\omega$ over a limited bandwidth, the calculated impulse response function $h_{chan}(t)$, will have inherent distortions created by the frequency domain quantization and the bandwidth limiting.

In addition, the size of the frequency sample will determine the length of the data vector $Y_{chan}(\omega)$ and the size of the impulse response function $h_{chan}(t)$. This implies that the time resolution is intimately linked to the size of the frequency data. If the frequency vector is, $$\omega \rightarrow \omega_m : \{\omega_1, \omega_2, \ldots, \omega_m\}$$

then the time domain vector will be $$t \rightarrow t_m : \{t_1, t_2, \ldots, t_m\}$$

where the sample time resolution is inversely proportional to $\omega_m$.

The IFT method loses some resolution with respect to other methods as discussed previously. In tests similar to those discussed, despite the resolution loss the IFT method does indicate the presence of targets such the plastic mine and the metal by changes in above derived signal. Since the IR can be implemented using a traditional FFT, it may have computation advantages over the DLS technique on some hardware platforms. The data may be collected using a Wiltron portable spectrum analyzer over a 2.5 GHz to 3.3 GHz band. The reference data may be generated on the fly and, in the present case, was taken approximately 6 inches behind the position of the detector.

Single Reflection Electromagnetic Model

The SREM method is based on a signal reflection electromagnetic model of the S11 data. In this approach, the error between the collected data and a theoretical model is plotted versus position. A land mine or other subterranean reflector causes a perturbation in the single reflection model and, thus, generates a peak in the SREM error function.

The Single Reflection Electromagnetic Model (SREM) detection method is considerably different from the DLS, CSD, and IFT techniques. The approach is based on the assumption that the S11 data should closely approximate a single reflection electromagnetic model, if no subterranean reflectors are present. In the presence of a reflector, the error between the SREM and collected data should increase, due to reflector interference.

Figure 10:
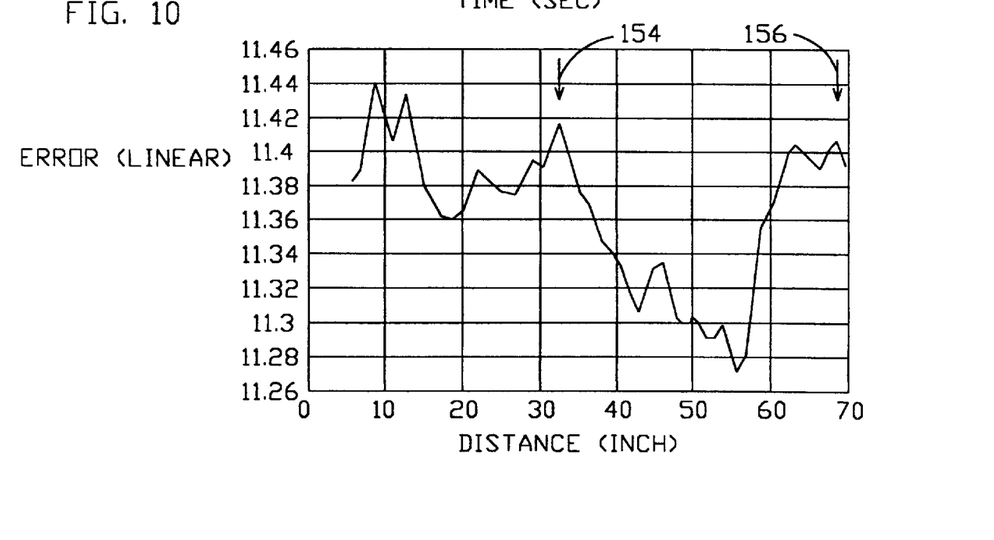
FIG. 10 is a schematic showing an integrated response for an embodiment of a method that includes, among other steps, a single reflection electromagnetic model error function versus time position in a wet dirt.

The SREM detection method is based on calculating the error, $$\xi = |S_{11}(\omega) - y_{tar}(\omega)|,$$

where $y_{tar}(\omega)$ is the frequency domain data collected by detection hardware and $S_{11}(\omega)$ is the theoretical SREM.

$$S_{11}(\omega) = \frac{Z_s(\omega) - Z_a}{Z_s(\omega) + Z_a},$$

where $Z_a = 377$ ohms is the impedance of air, and $Z_s(\omega)$ is the frequency dependent soil impedance. For a single reflection model, $Z_s(\omega)$, is defined by:

$$Z_s(\omega) = \frac{j\omega \mu_o}{\sqrt{j\omega \mu_o \sigma - \omega^2 \mu_o \varepsilon_o \varepsilon_r}},$$

where $\varepsilon_o = 8.85 \times 10^{-12}$ farads/meter $\varepsilon_r = 1$ $\mu_o = 4\pi \times 10^{-7}$ henry/meter $\sigma = 0.005 \Omega$ Results of the SREM method are shown in FIG. 10. This data was collected using a Wiltron portable spectrum analyzer over a 2.5 GHz to 3.3 GHz band. The error amplitude of the SREM method is an indication of single reflection interference. A plastic mine is located at approximately 33 inches and a metal can is located at 67.5 inches as indicated by the arrows 154 and 156, respectively. The soil is wet dirt.

The SREM is a very compact, highly efficient alternative to the DLS, CSD, and IFT detection methods discussed previously. The SREM model can be generated in advance, requires very little storage overhead, and can operate at very high speed, relative to the other methods. It can also be run concurrently with the DLS, IFT, and CSD processes, as a backup detector, with very little additional overhead.

While the preferred embodiment methods are disclosed in accord with the law requiring disclosure of the presently preferred embodiment of the invention, combinations of the methods disclosed may also be used. The optimum system depends on the application. In particular, the frequency range and bandwidth may be quite different to detect various objects. For example, a lower frequency range and lesser bandwidth would likely be appropriate to locate a pipeline as compared to mine detection. The processing methods discussed herein may be quite similar however. It is also possible to combine this detection system with a three dimensional location system to provide imaging contours of the target. As well, other equipment that provides the signals that contain the location information may also be used. Processing means including non-visual processing means may be used to indicate the probability of a mine by detecting unique characteristics of the signal, e.g., a relatively high amplitude double peak that suggests reflections from the top and bottom mine casings. Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A method of detecting anomalies in a microwave penetrable material, comprising:

transmitting a microwave signal that is stepped over a plurality of frequencies, said microwave signal being transmitted at each of a plurality of positions in said microwave penetrable material;

receiving a plurality of reflections for said plurality of frequencies at each of said plurality of positions, each of said plurality of reflections having a magnitude and a phase and a time delay;

producing a complex target data vector from said plurality of reflections at each of said plurality of positions;

producing a complex reference data vector which is representative of an anticipated complex target data vector of said microwave penetrable material when said anomalies to be detected are not present within said microwave penetrable material;

comparing said complex target data vector with said complex reference data vector for producing a response signal at each of said plurality of positions; and detecting said anomalies in said microwave penetrable material from changes in said response signal for each of said plurality of positions.

2. The method of claim 1, further comprising:

utilizing accelerometers to determine said plurality of positions in said microwave penetrable material.

3. The method of claim 1, further comprising:

comparing said complex reference data vector with respect to each said complex target data vector to produce a complex channel vector for said plurality of frequencies at each of said plurality of positions.

4. The method of claim 3, further comprising:

producing a complex filter matrix, said complex filter matrix being a least squares operator, and operating on said complex channel vector with said complex filter matrix to obtain said response signal for each of said plurality of positions.

5. The method of claim 1, wherein each of said plurality of reflections have a complex impedance with a real part and an imaginary part.

6. The method of claim 5, further comprising:

producing a complex impedance vector from said real part and said imaginary part for each of said plurality of reflections at each of said plurality of positions;

7. The method of claim 1, further comprising:

comparing said complex reference data vector with respect to each said complex target data vector to produce a complex channel vector for said plurality of frequencies at each of said plurality of positions;

adding a complex conjugate of said complex channel vector to said complex channel vector for each of said plurality of frequencies to form a conjugate symmetric complex channel vector; and taking an inverse Fourier transform of said conjugate symmetric complex channel vector to produce an impulse function to thereby indicate said anomalies in said microwave penetrable material.

8. The method of claim 1, wherein said step of producing a complex reference data vector for each of said plurality of positions further comprises:

providing a theoretical complex reference data vector.

9. A method of detecting anomalies in a microwave penetrable material, comprising the steps of:

transmitting a microwave signal that is stepped over a plurality of frequencies, said microwave signal being transmitted at each of a plurality of positions in said microwave penetrable material;

receiving a plurality of reflections for said plurality of frequencies at each of said plurality of positions, each of said plurality of reflections having a magnitude and a phase and a time delay;

producing a complex target data vector for each of said plurality of positions;

producing a complex reference data vector which is representative of said complex target data vector which is anticipated when said anomalies to be detected are not present within said microwave penetrable material;

comparing said complex reference data vector with respect to each said complex target data vector to produce a complex channel vector for said plurality of frequencies at each of said plurality of positions;

producing a complex filter matrix, said complex filter matrix being a least squares operator;

operating on said complex channel vector with said complex filter matrix to obtain a response signal for each of said plurality of positions; and detecting said anomalies in said microwave penetrable material from changes in said response signal for each of said plurality of positions.

10. The method of claim 9, further comprising producing said complex filter matrix of values for said plurality of frequencies and said time delays.

11. The method of claim 9, further comprising:

utilizing said magnitude and phase and time delay for each of said plurality of reflections to produce a respective said complex target data vector for each of said plurality of positions.

12. The method of claim 9, wherein said step of operating includes multiplying said complex filter matrix times said complex channel vector and dividing by the number of said plurality of frequencies to obtain a response signal for each of said plurality of positions.

13. The method of claim 9, wherein said complex filter matrix is constant for each of said plurality of positions.

14. The method of claim 9, further comprising:

utilizing said magnitude and phase and time delay for one or more of said plurality of reference reflections at one or more of said plurality of positions to produce said complex reference data vector.

15. The method of claim 9, further comprising:

utilizing accelerometers to determine said plurality of positions in said microwave penetrable material.

16. The method of claim 9, further comprising:
weighting values within a first said complex channel vector for a first of said plurality of positions with respect to corresponding values within a second said complex channel vector for a second of said plurality of positions.

17. The method of claim 16, wherein said corresponding values correspond to respective of said plurality of frequencies.

18. The method of claim 9, further comprising:
using a metal detector to distinguish metal objects buried within said microwave penetrable material.

19. The method of claim 9, wherein:
said complex reference data vector is constant for each of said plurality of positions.

20. The method of claim 9, wherein:
said complex reference data vector varies for at least two of said plurality of positions.

21. The method of claim 1, further comprising:
producing a display for said response signal.

22. A method of detecting anomalies in microwave penetrable material, comprising:
transmitting a microwave signal that is stepped over a plurality of frequencies, said microwave signal being transmitted at each of a plurality of positions in said microwave penetrable material;
receiving a plurality of reflections for said plurality of frequencies at each of said plurality of positions, each of said plurality of reflections having a complex impedance with a real part and an imaginary part;
producing a complex impedance vector from said real part and said imaginary part of said plurality of reflections at each of said plurality of positions;
producing a complex expectation vector such that said complex expectation vector is representative of said complex impedance vector when said anomalies to be detected are not present in said microwave penetrable material;
comparing said complex expectation vector with respect to said complex impedance vector at each of said plurality of frequencies to obtain a signal for each of said plurality of positions; and
detecting said anomalies in said microwave penetrable material from changes in values of said signal at each of said plurality of positions.

23. The method of claim 22, further comprising:
producing said complex expectation vector at each frequency from said real part and said imaginary part for each of said plurality of reflections, a respective said complex expectation vector being produced for each of said plurality of positions.

24. The method of claim 22, wherein said step of comparing further comprises subtracting said complex expectation vector with respect to said complex impedance vector to obtain a plurality of resulting values and taking a summation of said resulting values.

25. The method of claim 22, further comprising:
windowing said complex impedance vector by applying a weighting function to a first complex impedance vector at a first position with respect to a second complex impedance vector at a second position for respective of said plurality of frequencies.

26. The method of claim 22, further comprising:
utilizing accelerometers to determine said plurality of positions with respect to said microwave penetrable material.

27. The method of claim 22, further comprising:
producing a display for said signal.

28. A method of detecting anomalies in a microwave penetrable material, comprising the steps of:
transmitting a microwave signal that is stepped over a plurality of frequencies, said microwave signal being transmitted at each of a plurality of positions in said microwave penetrable material;
receiving a plurality of reflections for said plurality of frequencies at each of said plurality of positions, each of said plurality of reflections having a magnitude and a phase and a time delay;
utilizing said plurality of reflections to produce a complex target data vector for each of said plurality of positions;
producing a complex reference data vector such that said complex reference data vector is representative of said complex target data vector when said anomalies to be detected are not present in said microwave penetrable material;
comparing said complex reference data vector with respect to each said complex target data vector to produce a complex channel vector with respect to said plurality of frequencies for each of said plurality of positions;
adding a complex conjugate of said complex channel vector to said complex channel vector for each of said plurality of frequencies to form a conjugate symmetric complex channel vector;
taking an inverse Fourier transform of said conjugate symmetric complex channel vector to produce an impulse function to indicate said anomalies in said microwave penetrable material.

29. The method of claim 28, further comprising:
receiving a plurality of reference reflections for said plurality of frequencies at one or more of said plurality of positions, each of said plurality of reference reflections having a magnitude and a phase and a time delay, and
utilizing said magnitude and phase and time delay for each of said plurality of reference reflections at said one or more of said plurality of positions to produce said complex reference data vector.

30. The method of claim 28, further comprising:
selecting said one or more of said plurality of positions for said producing of said complex reference data, said selecting being continually updated such that said one or more of said plurality of positions are selected within a predetermined distance from a moving transmitter.

31. The method of claim 28, further comprising:
utilizing accelerometers to determine said plurality of positions in said microwave penetrable material.

32. The method of claim 28, further comprising:
weighting values within a first said complex channel vector for a first of said plurality of positions with respect to corresponding values within a second said complex channel vector for a second of said plurality of positions.

33. The method of claim 32, wherein said corresponding values correspond to respective of said plurality of frequencies.

34. The method of claim 32, further comprising:
using a metal detector to distinguish metal objects buried within said microwave penetrable material.

35. The method of claim 28, wherein:
said complex reference data vector is constant for each of said plurality of positions.

36. The method of claim 28, wherein:
said complex reference data vector varies for at least two of said plurality of positions.

37. A method of detecting anomalies in a microwave penetrable material, comprising the steps of:
transmitting a microwave signal that is stepped over a plurality of frequencies, said microwave signal being transmitted at each of a plurality of positions in said microwave penetrable material;
receiving a plurality of reflections for said plurality of frequencies at each of said plurality of positions, each of said plurality of reflections having a magnitude and a phase and a time delay;
utilizing said plurality of reflections to produce a complex target data vector for each of said plurality of positions;
providing a theoretical reference signal such that said theoretical reference data vector is representative of said complex target data vector anticipated when said anomalies to be detected are not present in said microwave penetrable material;
comparing said theoretical reference signal to said complex target data vector for each of said plurality of frequencies at each of said plurality of positions to produce an error signal; and
detecting said anomalies in said microwave penetrable material from changes in values of said error signal at each of said plurality of positions.

38. The method of claim 37, further comprising:
determining said theoretical reference signal to be equal to a first quantity of a frequency dependent soil frequency minus an impedance of air divided by a second quantity of said frequency dependent soil frequency plus said impedance of air.

39. The method of claim 37, further comprising:
utilizing accelerometers to determine said plurality of positions in said microwave penetrable material.

40. The method of claim 37, further comprising:
using a metal detector to distinguish metal objects buried within said microwave penetrable material.

41. A method of detecting anomalies in microwave penetrable material, comprising:
transmitting a microwave signal that is stepped over a plurality of frequencies, said microwave signal being transmitted at each of a plurality of positions in said microwave penetrable material;
receiving a plurality of reflections for said plurality of frequencies at each of said plurality of positions,
determining a complex reference signal such that said complex reference signal is representative of said complex antenna impedance when said anomalies to be detected are not present in said microwave penetrable material;
determining a complex antenna impedance for each of said plurality of reflections at each of said plurality of positions;
comparing said complex reference signal with said complex antenna impedance for each of said plurality of reflections at each of said plurality of positions to produce a complex difference signal for each of said plurality of reflections at each of said plurality of positions;
amplifying said complex difference signal for respective of said plurality of reflections at each of said plurality of positions to produce an amplified complex difference signal;
taking a Fourier transform of said complex difference signal to thereby produce a response signal; and
detecting said anomalies in said microwave penetrable material from changes in said response signal with respect to each of said plurality of positions.

42. The method of claim 41, wherein said step of determining said complex reference signal further comprises determining an average complex antenna impedance for at least two of said plurality of reflections.

43. The method of claim 41, wherein said step of determining said complex reference signal further comprises determining a theoretical value for said complex reference signal.

44. The method of claim 41, further comprising:
utilizing accelerometers to determine said plurality of positions with respect to said microwave penetrable material.

45. The method of claim 41, further comprising:
mitigating sensor height variations by normalizing said complex channel vector with said complex reference data vector.

46. The method of claim 41, further comprising:
weighting values within a first said complex channel vector for a first of said plurality of positions with respect to corresponding values within a second said complex channel vector for a second of said plurality of positions.

47. The method of claim 46, wherein said corresponding values correspond to respective of said plurality of frequencies.

48. The method of claim 41, further comprising:
using a metal detector to distinguish metal objects buried within said microwave penetrable material.

49. The method of claim 41, wherein:
said complex reference data vector is constant for each of said plurality of positions.

50. The method of claim 41, wherein:
said complex reference data vector varies for at least two of said plurality of positions.

51. The method of claim 41, further comprising:
producing a display for said response signal.

52. A method of detecting anomalies in microwave penetrable material, comprising:
transmitting a microwave signal that is stepped over a plurality of frequencies, said microwave signal being transmitted at each of a plurality of positions into said microwave penetrable material;
utilizing one or more accelerometers to measure location information for each of said plurality of positions;
receiving a plurality of reflections for said plurality of frequencies at each of said plurality of positions;
producing a complex target data vector at each of said plurality of positions;
producing a complex reference data vector for each of said plurality of positions such that said complex reference data vector is representative of said complex target data vector when said anomalies to be detected are not present in said microwave penetrable material;
comparing said complex target data vector with said complex reference data vector for producing a response signal at each of said plurality of positions; and
detecting said anomalies in said microwave penetrable material from changes in said response signal for each of said plurality of positions.

* * * * *